(12) United States Patent
Caramico

(10) Patent No.: US 11,301,448 B2
(45) Date of Patent: Apr. 12, 2022

(54) METHOD AND SYSTEM OF A SECONDARY INDEX IN A DISTRIBUTED DATA BASE SYSTEM

(71) Applicant: Luigi Caramico, Foster City, CA (US)

(72) Inventor: Luigi Caramico, Foster City, CA (US)

(*) Notice: Subject to any disclaimer, the term of this patent is extended or adjusted under 35 U.S.C. 154(b) by 0 days.

(21) Appl. No.: 16/858,685

(22) Filed: Apr. 26, 2020

(65) Prior Publication Data
US 2021/0081387 A1 Mar. 18, 2021

Related U.S. Application Data

(63) Continuation-in-part of application No. 16/843,647, filed on Apr. 8, 2020, now abandoned.

(60) Provisional application No. 62/831,195, filed on Apr. 9, 2019.

(51) Int. Cl.
  *G06F 16/22* (2019.01)
  *G06F 16/21* (2019.01)
  *G06F 21/62* (2013.01)

(52) U.S. Cl.
  CPC ........ *G06F 16/2272* (2019.01); *G06F 16/211* (2019.01); *G06F 16/2246* (2019.01); *G06F 21/6227* (2013.01)

(58) Field of Classification Search
  CPC ............. G06F 16/2246; G06F 16/2272; G06F 16/211; G06F 21/6227; G06F 16/22; G06F 16/21; G06F 21/62
  USPC .......................................... 707/741
  See application file for complete search history.

(56) References Cited

U.S. PATENT DOCUMENTS

| | | | | |
|---|---|---|---|---|
| 7,822,727 | B1* | 10/2010 | Shaughnessy | G06F 16/2365 707/703 |
| 2009/0055422 | A1* | 2/2009 | Williams | H03M 7/30 |
| 2013/0073525 | A1* | 3/2013 | Damon | G06F 16/13 707/691 |
| 2017/0063695 | A1* | 3/2017 | Ferrell | H04L 49/9084 |

* cited by examiner

*Primary Examiner* — Kuen S Lu

(57) ABSTRACT

In one aspect, a computerized method for building a secondary index used to access index keys in a distributed database includes the step of providing a distributed database. The computerized method includes the step of providing a database file of the distributed database or on a cluster. The computerized method includes the step of building a first database index of index keys of the database file. The computerized method includes the step of organizing the first database index. The computerized method includes the step of, based on the organization of the first database index, building a second database index.

6 Claims, 4 Drawing Sheets

METHOD AND SYSTEM OF A SECONDARY INDEX IN A DISTRIBUTED DATA BASE SYSTEM

CLAIM OF PRIORITY

This application claims priority to and is a continuation-in-part of U.S. patent application Ser. No. 16/843,647, filed on 8 Apr. 2020 and titled METHOD AND SYSTEM OF A SECONDARY INDEX IN A DISTRIBUTED DATABASE SYSTEM. U.S. patent application Ser. No. 16/843,647 claims priority to U.S. Provisional Patent Application No. 62/831,195, filed on 9 Apr. 2019 and titled METHOD AND SYSTEM OF A SECONDARY INDEX IN A DISTRIBUTED DATA BASE SYSTEM. These applications are incorporated by reference herein in their entirety.

BACKGROUND

The database industry created indexes to speed up access to data using a smaller better organized set of data to increase efficiency to find the data. However, the index technology in use today is essentially a serial technology and may not allow parallel processing.

Today, the massive increase of data needs an updated approach (e.g. 'Big Data', etc.). This new approach is based on massive parallel solutions. The massive parallel solution may not be compatible with the index solution and therefore indexes are not used. This can increase the amount of workload needed to find the data. For example, this can be due to the increasing of the size of the cluster by adding additional servers. Accordingly, there is a need for improvements to database management that include new parallel index solutions.

BRIEF SUMMARY

In one aspect, a computerized method for building a secondary index used to access index keys in a distributed database includes the step of providing a distributed database. The computerized method includes the step of providing a database file of the distributed database or on a cluster. The computerized method includes the step of building a first database index of index keys of the database file. The computerized method could include the step of sorting or other organization of the first database index. The computerized method includes the step of, based on the sorted or other organization of the first database index, building a second database index.

Figure 1:
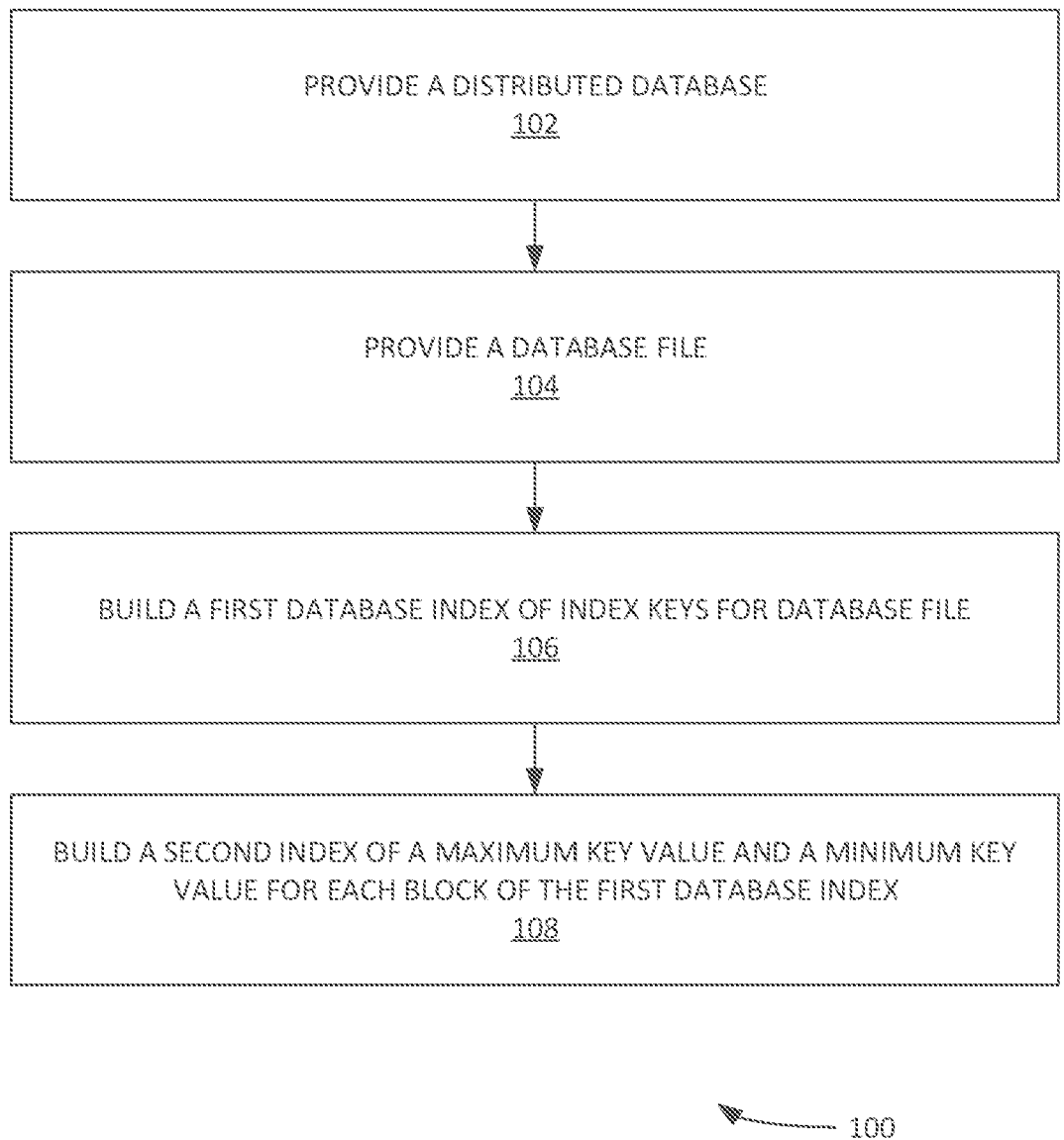
FIG. 1 illustrates an example process for building a secondary index used to access index keys, according to some embodiments.

The Figures described above are a representative set and are not an exhaustive with respect to embodying the invention.

DESCRIPTION

Disclosed are a system, method, and article of manufacture for using a secondary index in a distributed data base system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment'; 'an embodiment'; 'one example'; or similar language means that a particular feature, structure, or characteristic described in connection with the embodiment is included in at least one embodiment of the present invention. Thus, appearances of the phrases 'in one embodiment'; 'in an embodiment'; and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Database is an organized collection of data. The data can be stored and accessed electronically from a computer system.

B-tree is a self-balancing tree data structure that maintains sorted data and allows searches, sequential access, insertions, and deletions in logarithmic time. The B-tree generalizes the binary search tree, allowing for nodes with more than two children.

Index is a data structure that improves the speed of data retrieval operations on a database table. Indexes are used to locate data without having to search every row in a database table every time a database table is accessed.

Indexed sequential access method (ISAM) is a method for creating, maintaining, and manipulating computer files of data so that records can be retrieved sequentially or randomly by one or more keys. Indexes of key fields are maintained to achieve fast retrieval of required file records in Indexed files.

Primary key can be a set of attributes (columns) that uniquely specify a tuple (row) in a relation (table).

EXAMPLE METHODS

In one example, a file system can place files in blocks. The file system can then distribute the various blocks to each server node in a distributed database cluster. Blocks can be replicated on more than one server-node machine (e.g. for data redundancy). For example, a file can be split and specified server-node machines can have n-blocks of the file. A first index can be generated to locate the file's blocks. In order to speedup a look up on the first index, a second index can be generated. For a sorted-version of the first index, the second index can keep a maximum and minimum value of the key for each respective block of the first index's block (e.g. along with the physical location of said block). The server-node implementing a lookup of the first index can then read the second index until a value of the searched for key is found with the maximum and minimum value of the second index's block is located. This block can then be read to determine the physical location of the index key of the first index. The server-node can then access the physical location of the first index directly. The second index (e.g. a second database index) can be generated based on the logical/physical subdivision of the data stored on the media with the value of the key included in that block. For example, each logical storage block can become an entry of the second index with minimum and maximum value of the key in that block and the pointer to the block of the first index.

FIG. 1 illustrates an example process for building a secondary index used to access index keys, according to some embodiments. In step 102, a distributed database can be provided. In step 104, a database file can be provided with the distributed database. A database can be logical sequence of data stored on a computer's media (e.g. semiconductor storage media, magnetic storage media, optical storage media, etc.).

In step 106, process 100 can build a first database index of index keys for database file. Process 100 can sort this first database index. This can be a sort or another type of logical organization such as, inter alia: a B-tree, ISAM, etc.

In step 108, based on the sorted first database index, process 100 can build a second index. Each block of the second index can include a maximum key value and a minimum key value for each block of the sorted first database index. Each block of the second index can also include the physical location of the index keys in the first database index.

Figure 2:
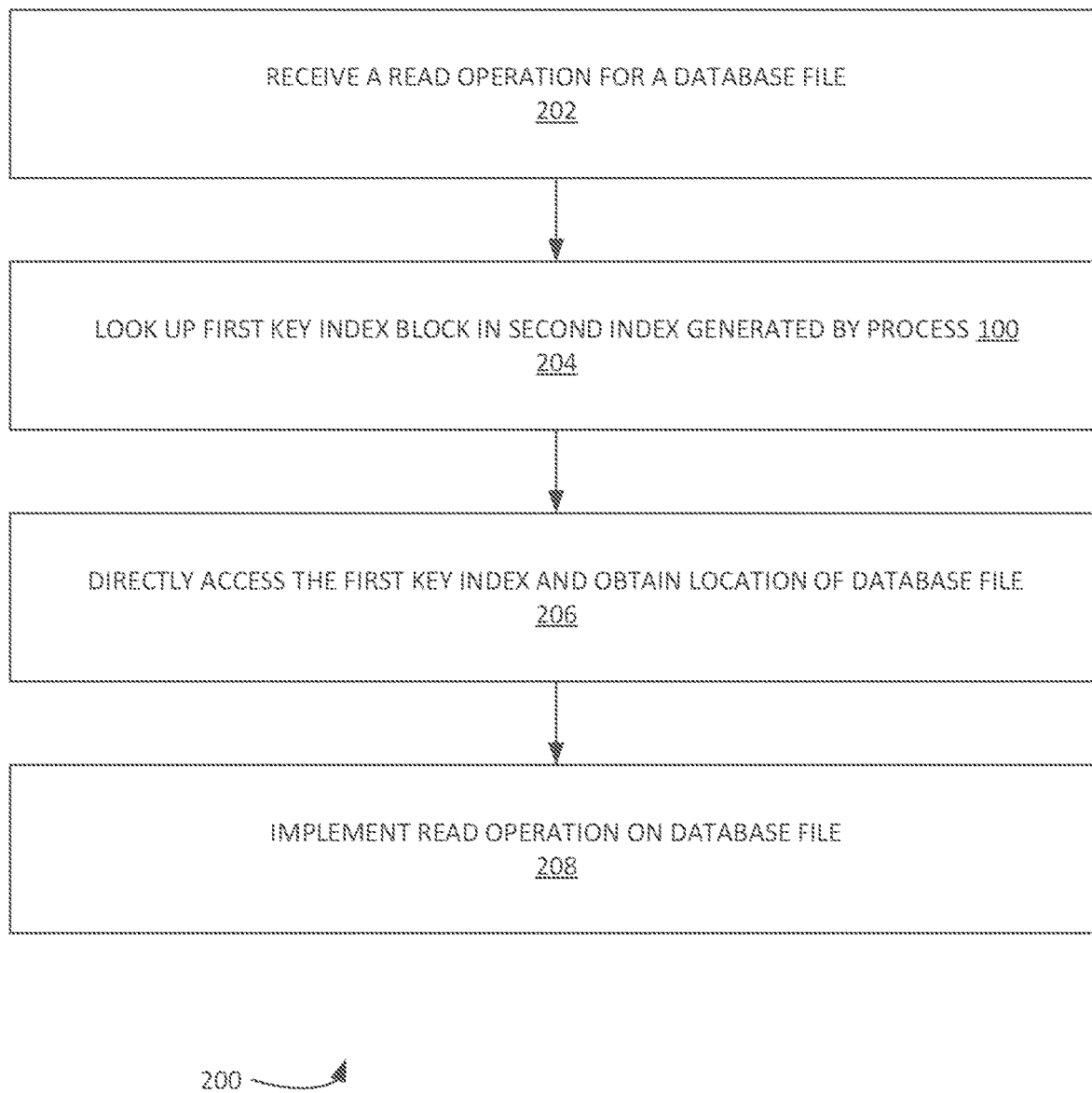
FIG. 2 illustrates an example process for using a secondary index to directly access a first index, according to some embodiments.

FIG. 2 illustrates an example process for using a secondary index to directly access a first index, according to some embodiments. In step 202, process 200 can receive a read operation for a database file. In step 204, process 200 can look up first key index block in second index generated by process 100. In step 206, process 200 can directly access the first key index and obtain location of database file. In step 208, process 200 can implement read operation on database file.

In one example, a search for block number 40 can be implemented. The search can first scan the second index and determine that block 40's location in a first index is in the second index's block with a minimum value of 11 and a maximum value of 60. The search obtains the physical location of block 40 from this location in the second index. The search then stops scanning the second index and goes directly to the indicated physical location in the first index to obtain the index key. A scan of the block 40's index can be read, and a read of the respective file performed.

Figure 3:
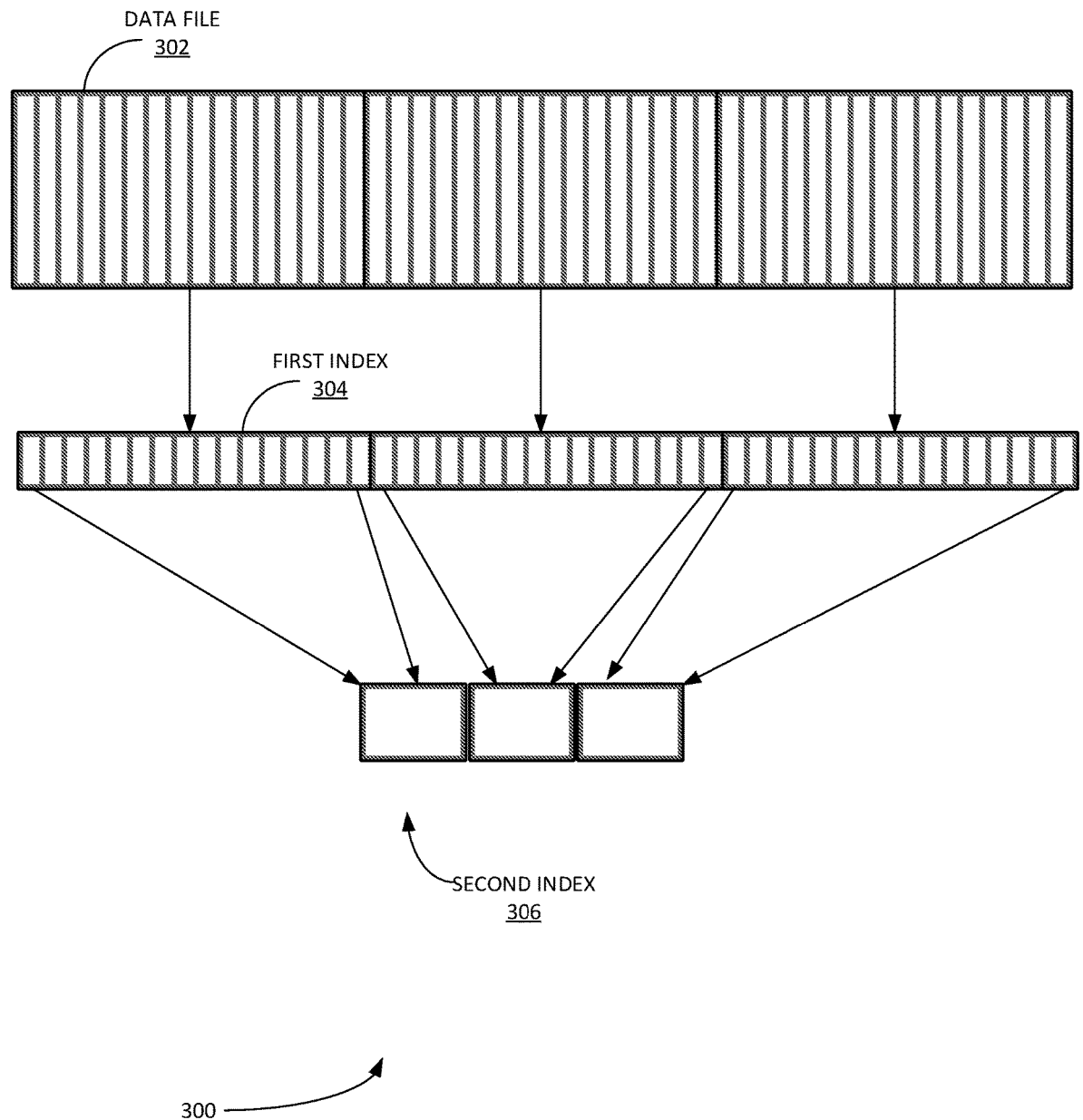
FIG. 3 illustrates a schematic representation of a process for dividing a database file into a second index, according to some embodiments.

FIG. 3 illustrates a schematic representation of a process for dividing a database file into a second index, according to some embodiments. A database file can be a logical sequence of data stored on a computer(s) storage media. Data file 302 can be divided and a set of index keys for database file can be generated as first index(es) 304. First index(es) 304 can be sorted. This can be a sort or another type of logical organization such as, inter alia: a B-tree, ISAM, etc.

Based on the sorted first database index, second index 306 can be built. Each block of second index 306 include a maximum key value and a minimum key value for each block first index 304 as shown. The second database index can be generated based on a logical subdivision of the data or a physical subdivision of data file 302 as stored on a media with a value of the key included in the respective block. Each logical storage block becomes an entry of the second database index with a minimum value and a maximum value of the key in the respective block and a pointer to the respective block of the first index. Each block of the second index can also include the physical location of the index keys in first index 304.

ADDITIONAL COMPUTER ARCHITECTURE

Figure 4:
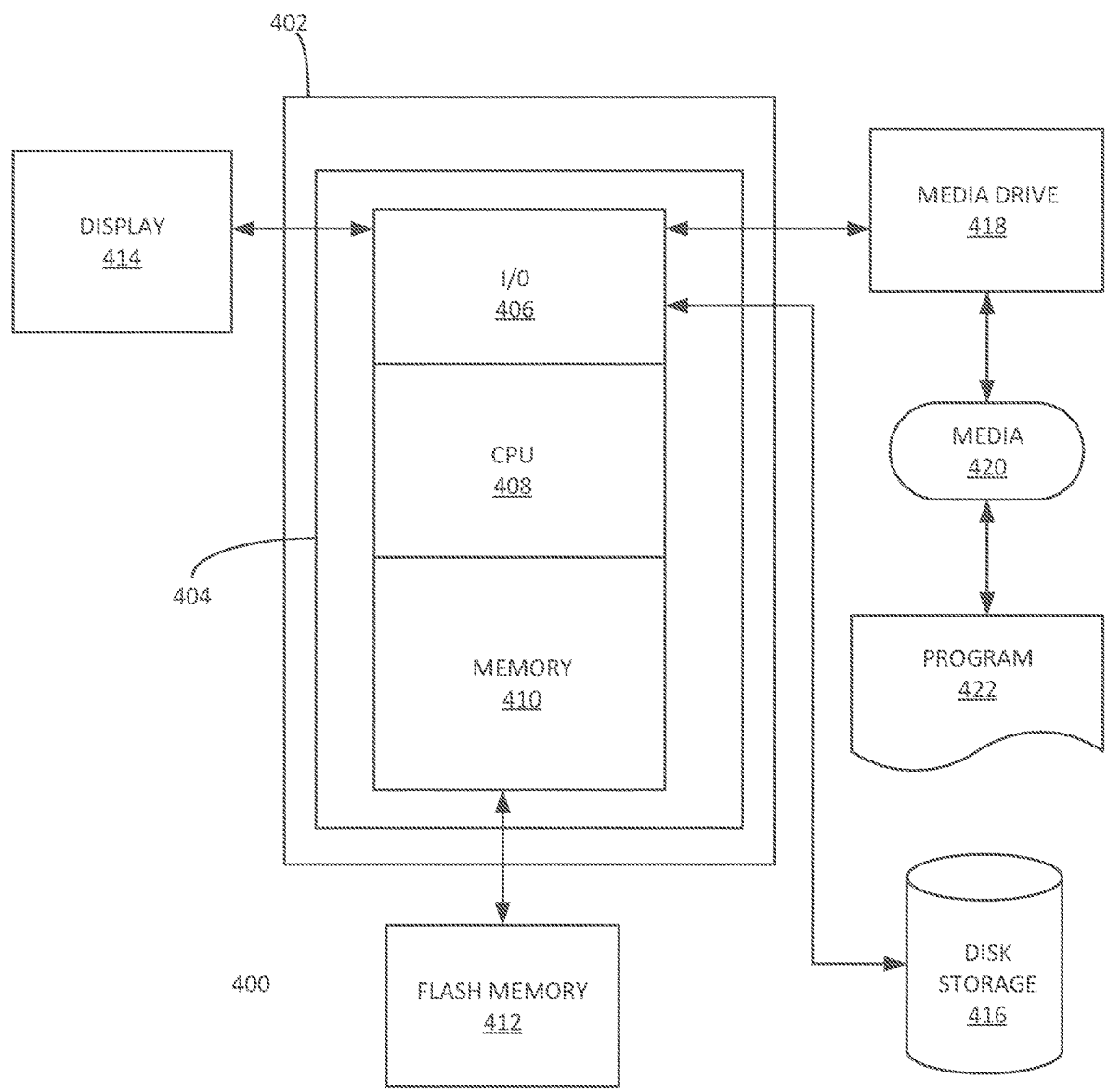
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for building a secondary index used to access index keys in a distributed database comprising:
    providing a distributed database;
    providing a database file of the distributed database on a cluster;
    building the first index of the database file based on the key field;
    organizing the first database file index; and
    based on the organization of the first database file index, building a second database file index; and
    using the secondary database file index to directly access the first database file index,
    wherein the second database file index is generated based on a physical subdivision of the data stored on a media with a value of the key included in the respective block,
    wherein each logical storage block becomes an entry of the second database file index with a minimum value and a maximum value of the key in the respective block and a pointer to the respective block of the first database file index,
    wherein each block of the second database file index includes a maximum key value for each block of the sorted first database file index,
    wherein each block of the second database file index includes a minimum key value for each block of the sorted first database file index,
    wherein each block of the second database file index includes a physical location of the index keys in the first database file index,
    wherein the step of using the secondary database file index to directly access the first database file index further comprises:
        receiving a read operation for the database file,
    wherein the step of using the secondary database file index to directly access the first database file index further comprises:
        looking up a first key index block in the second database file index,
    wherein the step of using the secondary database file index to directly access the first database file index further comprises:
        directly accessing the first key index and obtaining a location of the database file.

2. The computerized method of claim 1, wherein the step of using the secondary database file index to directly access the first database file index further comprises:
    implementing a read operation on the database file.

3. The computerized method of claim 1, wherein the database file comprises a logical sequence of data stored on a computer media.

4. The computerized method of claim 1, wherein the organization of the first index comprises a sorting of the first index.

5. The computerized method of claim 1, wherein the organization of the first index comprises a b-tree organization of the first index.

6. The computerized method of claim 1, wherein the organization of the first index comprises an Indexed sequential access method (ISAM) organization.

* * * * *